Feb. 6, 1934.   J. M. CHRISTMAN   1,946,391
SPRING COVER
Filed April 12, 1930   2 Sheets-Sheet 1
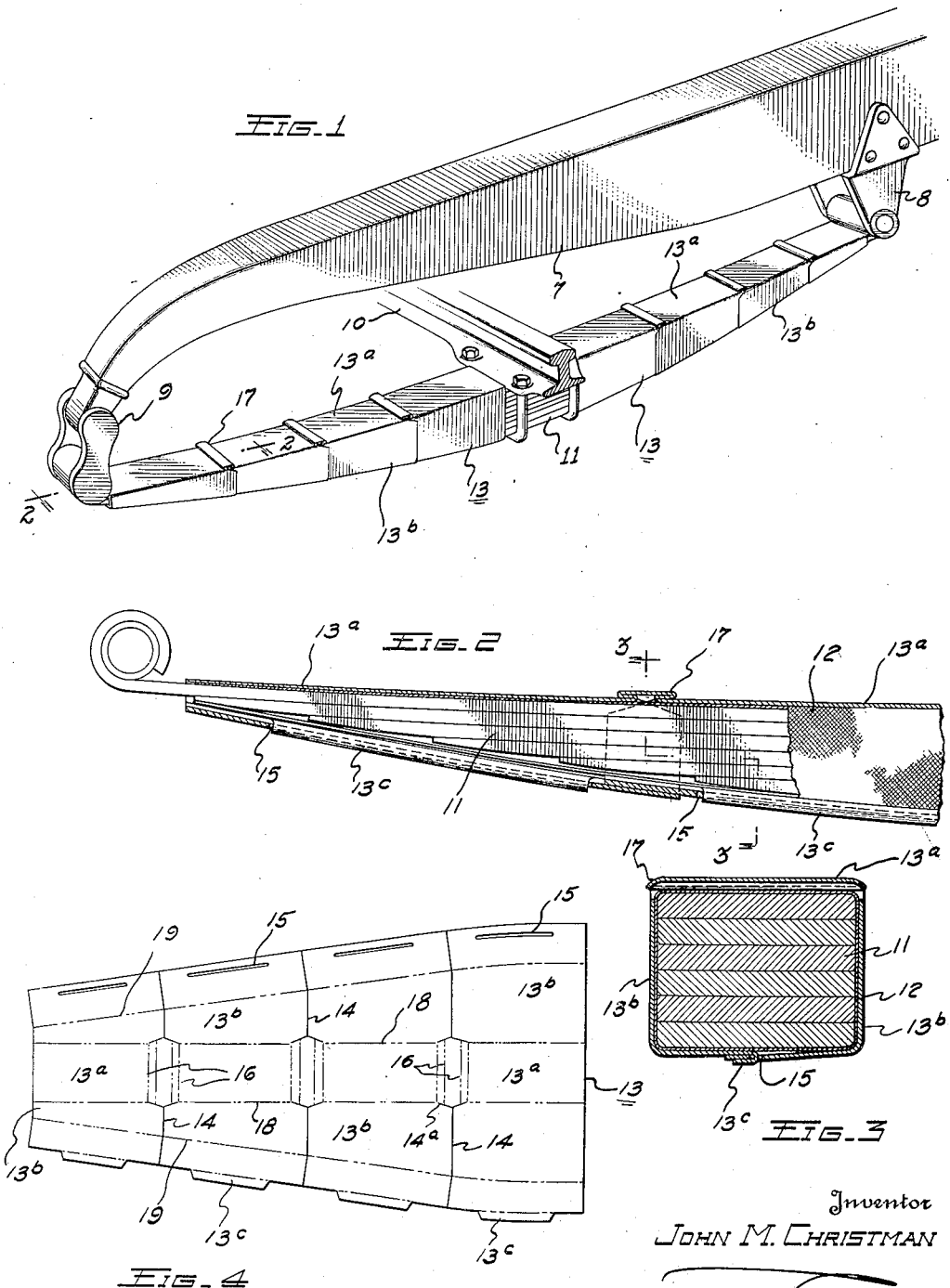
Inventor
JOHN M. CHRISTMAN
By  Mellin Sitleto
Attorney Feb. 6, 1934.         J. M. CHRISTMAN         1,946,391
                        SPRING COVER
              Filed April 12, 1930      2 Sheets-Sheet 2
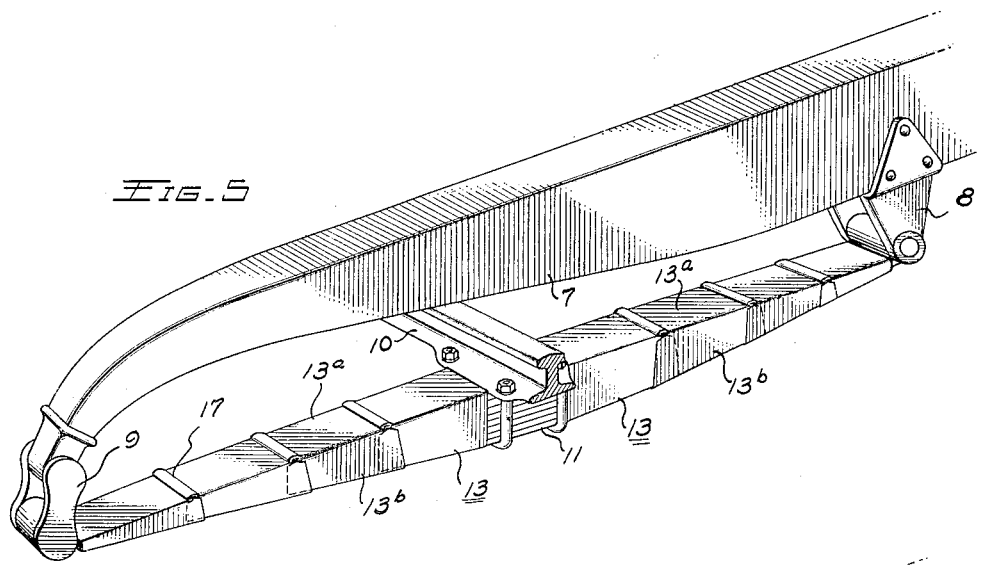
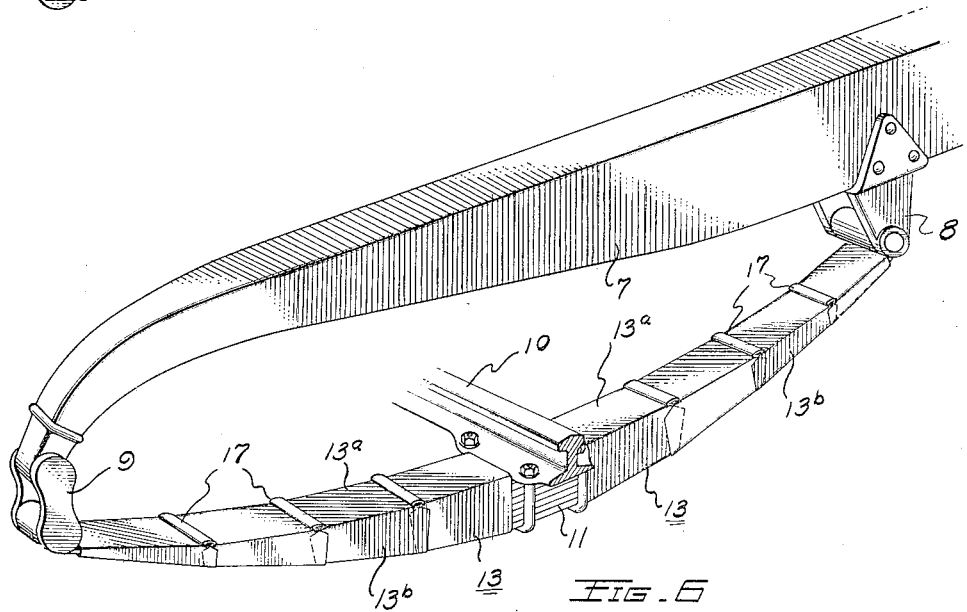
Inventor
JOHN M. CHRISTMAN
By Milton Tibbetts
              Attorney Patented Feb. 6, 1934

1,946,391

UNITED STATES PATENT OFFICE 1,946,391

SPRING COVER

John M. Christman, Detroit, Mich., assignor to Packard Motor Car Company, Detroit, Mich., a corporation of Michigan Application April 12, 1930. Serial No. 443,637

2 Claims. (Cl. 267—37)

This invention relates to multiple-leaf springs and its primary object is to provide an improved casing for retaining lubricant and for protecting such springs from water and dirt.

It will be best understood by description with reference to the attached drawings illustrating one practicable embodiment thereof as applied to a spring of the character generally used on motor vehicles.

In said drawings:

Fig. 1 is a perspective view of part of an automobile chassis frame with attached spring encased according to the invention, the vehicle axle being shown broken away;

Fig. 2 is a part longitudinal section of the spring casing taken on the line 2—2 of Fig. 1 with the spring shown in elevation;

Fig. 3 is an enlarged transverse section taken on the line 3—3 of Fig. 2;

Fig. 4 is a plan view of the blank or metal piece from which the casing is formed;

Fig. 5 is a view similar to Fig. 1 illustrating the action of the casing under one condition of load on the spring; and Fig. 6 is also a view similar to Fig. 1 illustrating the action of the casing under another condition of load on the spring.

An automobile chassis frame is represented by the beam 7 having a hanger bracket 8 fixed to its intermediate part and an arcuated end carrying a shackle 9 of familiar type. Connected between these suspension elements and bolted to the axle 10 in the usual way is shown a semi-elliptic spring 11 of multiple-leaf form.

This spring is advantageously packed in a lubricative grease confined thereto by a jacket or wrapping 12 of canvas or the like before applying the protective casing.

The illustrative casing comprises a piece 13 of sheet metal cut to a trapezoidal shape conformative to the spring and to length somewhat exceeding the part of the spring to be encased. At spaced intervals along its length this piece is slitted partially across from the side edges as indicated by the full lines 14 in Fig. 4, thereby leaving its central portion intact or continuous in a longitudinal strip 13ª and providing a plurality of sections 13ᵇ at the sides. The slitting is terminated in a fork or Y 14ª at the marginal lines of the strip portion, which latter is allowed a width corresponding to that of the spring intended to be covered. In this instance, the sections at one side are formed with projections 13ᶜ and those at the other side with slot openings 15 to provide for joining to one another, but the manner of connection is largely immaterial and may be effected in a number of different ways so that it is not intended to specify, nor limit the invention to any particular form or means.

The strip portion 13ª of the piece is then bent or crimped upon itself transversely on the dotted lines 16 in the form of gathers or folds 17 at the intervals of slitting, so as to bring the side sections 13ᵇ into overlapping relation for substantial extents of contact with each other. This is made possible by the forked or Y termini of the slitting and shortens the piece into connected sections to the proper total length for encasing the spring part. Angular ends of the folds 17 are bent downwardly forming small lips which overlie the openings above the overlapping side portions 13ᵇ to seal the spring from water and dirt.

It may afford better understanding and appreciation of the invention to here state that the overlap provided or attainable in the form of single piece casings heretofore known is too limited in extent to permit a flexing with the spring without drawing and spreading the sections apart, especially at flexure extremes, which of course impairs or destroys the protective capacity of such casings and gives rise to possibility of buckling in return to normal position. Other forms of casings lack the necessary flexibility to allow free play of the spring. The common practice therefore is to employ separate sections applied telescopically, but the sections are likely to shift longitudinally in this arrangement. These defects are remedied by this invention which provides an overlap equal or comparable to the separate section arrangement, assures high flexibility with a hinge like integral connection of the sections and prevents undue longitudinal movement or shift on the spring.

After crimping the strip portion as described, the side sections 13ᵇ of the piece are bent downwardly in their overlapping relation along the marginal lines 18 of said strip portion (see Fig. 4), while the lower or outward ends of these sections in their aforesaid relation are bent inwardly along marginal lines 19 corresponding to the bottom edges of the spring, thereby preparing the device for fit and easy application thereto.

The casing or piece thus preparatorily bent is engaged over the spring with its strip portion 13ª on top and of course extending lengthwise thereof. The lower ends of its overlapping side sections 13ᵇ are then drawn together under the spring and there connected, preferably in an overlap joint, with the upper or major portions of said sections close against the spring sides. While a wing and slot fastening is represented, the joining may be effected in a number of different ways as before stated.

The applied casing has the appearance of a plurality of telescoped sections having a hinge connection with each other. The transverse bends or folds 17 in the strip portion in fact give a free flexing action to the casing much like hinged parts. In this connection it will be observed that the overlapped sections play or yield over the convex face of the spring, which happens to be the bottom in this case. The extent of overlapping attained by the formation described is sufficiently great to prevent the sections from drawing or spreading apart even with extreme outward flexure of the spring. Longitudinal movement or shift is prevented by tight fit to the spring and by abutment against the axle and shackle at opposite ends.

In Fig. 5 the encased spring is shown under condition of full load. In Fig. 6 it is shown under condition of rebound. These views contrastingly illustrate the overlap relation of the integral sections in the two extremes of spring flexure, the underlying edges being represented by dotted lines along the sides. The relation under condition of normal load is shown in Fig. 1 and also in Fig. 3 and the novelty and advantages of a casing in this form are believed to be apparent.

The described means and method of encasing a spring is of course applicable to springs of form other than shown and obviously applicable as well to other objects. As the invention is susceptible of various adaptations and modifications to suit different requirements and conditions, the appended claims are not intended to limit the same to the specific form and arrangement shown.

Having thus described my invention, what I claim as new and desire to secure by Letters Patent of the United States is:

1. A cover for a vehicle suspension spring comprising a single sheet of metal having two substantially aligned transversely extending opposed Y-slits therein and folded longitudinally along the ends of the arms of the Y-slits to form a top and partially overlapping depending sides, said top being bent transversely at the ends of the arms of the Y-slits to form a flat fold and the angular ends of the fold being turned down.

2. A cover for a vehicle suspension spring comprising a single sheet of metal having two substantially aligned transversely extending opposed Y-slits therein and folded longitudinally along the ends of the arms of the Y-slits to form a top and partially overlapping depending sides, said top being bent transversely between the Y-slits to form a flat fold and the angular ends of the fold being turned down.

JOHN M. CHRISTMAN.